(12) United States Patent
Seta et al.

(10) Patent No.: US 8,463,475 B2
(45) Date of Patent: Jun. 11, 2013

(54) CONTROL DEVICE FOR ELECTRIC VEHICLE

(75) Inventors: Itaru Seta, Tokyo (JP); Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/022,968

(22) Filed: Feb. 8, 2011

(65) Prior Publication Data
US 2011/0202220 A1 Aug. 18, 2011

(30) Foreign Application Priority Data
Feb. 17, 2010 (JP) .................................. 2010-032180

(51) Int. Cl.
*B60L 15/20* (2006.01)

(52) U.S. Cl.
USPC ........................................... 701/22; 180/65.1

(58) Field of Classification Search
USPC ................. 701/22, 29.2, 99; 180/65.1, 65.29, 180/65.21, 65.25, 65.225, 65.245; 318/138; 320/134, 135, 130–132; 307/24, 26; 340/455, 340/449; 702/57, 61, 63
See application file for complete search history.

(56) References Cited

U.S. PATENT DOCUMENTS
6,702,052 B1 * 3/2004 Wakashiro et al. ........ 180/65.25
8,135,532 B2 * 3/2012 Heap et al. ...................... 701/99

FOREIGN PATENT DOCUMENTS
JP 10-304503 A 11/1998

* cited by examiner

*Primary Examiner* — Marthe Marc-Coleman
(74) *Attorney, Agent, or Firm* — McDermott Will & Emery LLP

(57) ABSTRACT

A control device for an electric vehicle where a threshold storing unit is provided which stores two large and small thresholds and (first threshold>second threshold), and a drive state switching unit is provided which reduces torque output of a drive motor, while allowing accessories to operate, when a remaining energy capacity SOC from a remaining energy capacity detecting unit fails below the first threshold, and stops power supply to the drive motor, while allowing the accessories to operate, when the remaining energy capacity SOC from a remaining energy capacity detecting unit falls below the second threshold.

2 Claims, 3 Drawing Sheets

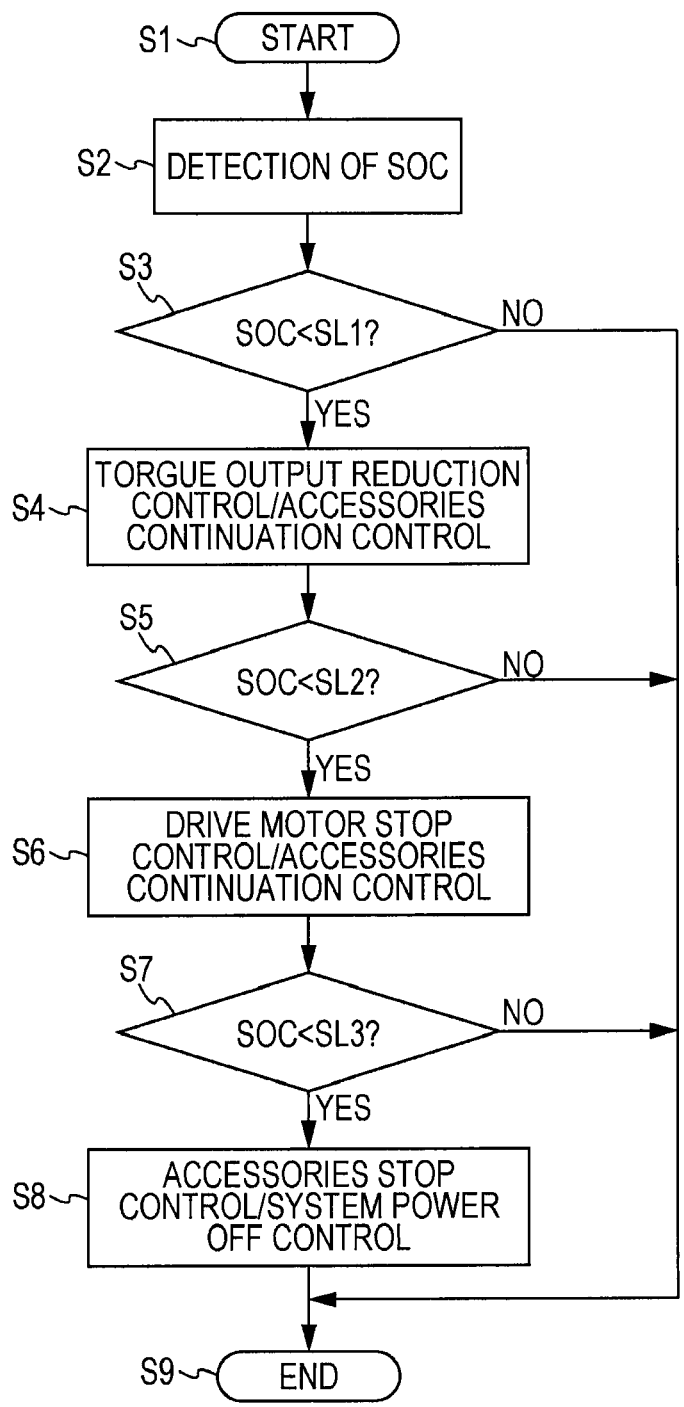

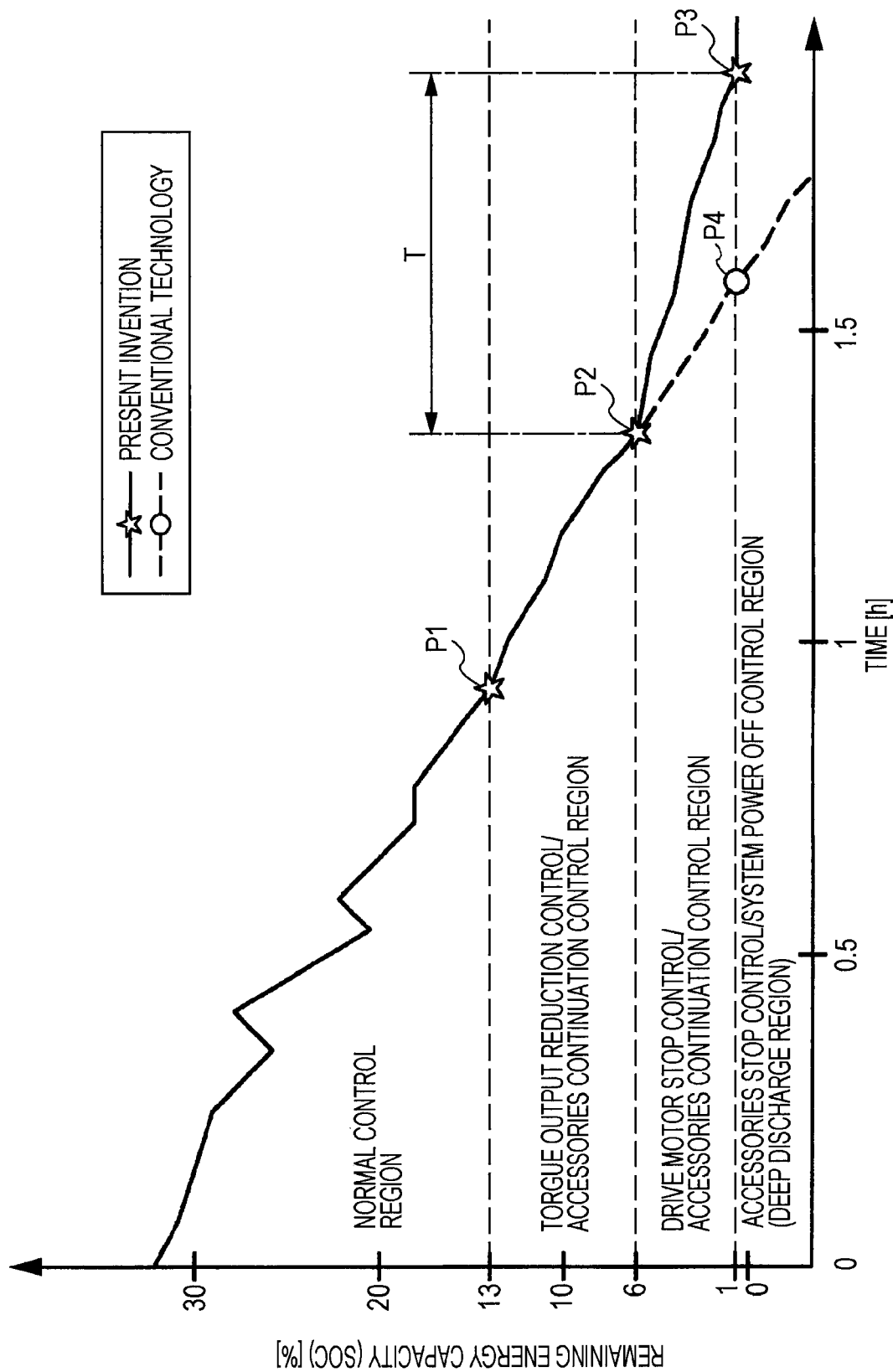

CONTROL DEVICE FOR ELECTRIC VEHICLE

CROSS REFERENCES TO RELATED APPLICATIONS

The present application claims priority from Japanese Patent Application No. 2010-032180 filed on Feb. 17, 2010, the entire contents of which are hereby incorporated by reference.

BACKGROUND OF THE INVENTION

1. Field of the Invention

The present invention relates to a control device for an electric vehicle that controls electric power from a high-voltage battery to drive a drive motor and accessories.

2. Description of the Related Art

An electric vehicle is equipped with a high-voltage battery comprised of a lithium-ion rechargeable battery, nickel metal hydride rechargeable battery or the like, and a drive motor comprised of a three-phase DC motor, PM motor or the like. Electric power from the high-voltage battery (approximately 300 volts) is power converted by an inverter that is controlled by a vehicle control unit and provided to the drive motor. In addition, electric power from the high-voltage battery is stepped down to approximately 14 volts by a DC-DC converter and provided to accessories such as a power steering pump, negative pressure pump for a brake, electric motor for a wiper device and headlight.

Since the high-voltage battery drives various loads installed at the electric vehicle as described, the high-voltage battery is designed to be resistant to repeated charging and discharging. However, due to the its nature, when the remaining energy capacity (SOC) of the high-voltage battery substantially decreases and the high-voltage battery enters a deep discharge state, decreased functionality of the high-voltage battery such as decrease in charging capacity occur. Therefore, a drive state of the drive motor and accessories, i.e., remaining energy capacity of the high voltage battery is monitored so that the high-voltage battery is prevented from entering the deep discharge state.

As a technology that prevents the high-voltage battery from entering a deep discharge state and secures driving performance of the electric vehicle, a control device for an electric vehicle is known that is disclosed in, for example, Japanese Unexamined Patent Application Publication No. 1998-304503 (hereunder referred to as "Patent Document 1") (See especially FIG. 4 of Patent Document 1). The control device for an electric vehicle described in Patent Document 1 detects a remaining energy capacity (battery voltage) of the high-voltage battery and decreases output of the drive motor according to a decrease in the remaining energy capacity. Accordingly, the high-voltage battery can be prevented from entering a deep discharge state and driving performance of an electric vehicle can be secured.

However, according to the control logic of the control device for an electric vehicle described Patent Document 1, when the remaining energy capacity of the high-voltage battery becomes low, and, for example, the electric vehicle enters a state such that it stops (driving impossible state), the accessories driven by the high-voltage battery may also stop. In this case, when the accessories stop while the electric vehicle is driving on a flat road or uphill, the electric vehicle does not exhibit an acceleration behavior and hardly gives anxiety to the driver. On the other hand, when the accessories stop while the electric vehicle is driving on a downhill, the electric vehicle exhibits an acceleration behavior but the operational performance of accessories assisting the driver's operation becomes low, which may give anxiety to the driver.

SUMMARY OF THE INVENTION

The present invention is made in view of the above, and it is an object of the present invention to provide a control device for an electric vehicle that continuously drives accessories even when a remaining energy capacity of the high-voltage battery becomes low.

According no a first aspect of the present invention, there is provided a control device for an electric vehicle which is a drive control for an electric vehicle that controls electric power from a high-voltage battery and drives a drive motor and accessories. The control device for an electric vehicle is composed of a remaining energy capacity detecting unit that detects a remaining energy capacity of the high-voltage battery, a threshold storing unit that stores a first threshold and a second threshold smaller than the first threshold that are to be compared with a detection signal from the remaining energy capacity detecting unit, and a drive state switching unit that compares the detection signal and the first and second signals and switches a drive state of the drive motor and accessories in response to a comparison result. When the detection signal falls below the first threshold, the drive state switching unit reduces torque output of the drive motor, while allowing the accessories to operate. When the detection signal falls below the second threshold, the drive state switching unit stops power supply to the drive motor, while allowing the accessories to operate.

According to a second aspect of the present invention, in the control device for an electric vehicle according to the first aspect, the threshold storing unit stores a third threshold that is smaller than the second threshold and a lower limit of the remaining energy capacity of the high-voltage battery, and the drive state switching unit stops the operation of the accessories when the detection signal falls below the third threshold.

According to the control device for an electric vehicle of the present invention, the threshold storing unit is provided which stores two large and small thresholds (first threshold>second threshold) and the drive state switching unit is provided which reduces torque output of the drive motor while allowing the accessories to operate when the detection signal from the remaining energy capacity detecting unit falls below the first threshold, and stops power supply to the drive motor while allowing the accessories to operate when the detection signal from the remaining energy capacity unit falls below the second threshold. Therefore, when the remaining energy capacity of the high-voltage battery becomes low, it is possible so reduce torque output to the drive motor and then to stop power supply thereto, while driving the accessories. Accordingly, even when the energy capacity of the high-voltage battery becomes low and the electric vehicle enters a driving impossible state, it is possible continuously to drive the accessories. As a result, when, for example, the remaining energy capacity of the high-voltage battery becomes low while the electric vehicle is driving on a downhill, the drive state of the accessories assisting she driver's operation dose not become low, which does not give anxiety to the driver.

According to the control device for an electric vehicle of the present invention, the third threshold which is smaller than the second threshold and the lower limit of the remaining energy capacity of the high-voltage battery is stored in the threshold storing unit, and the drive state switching unit stops the operation of the accessories when the detection signal falls below the third threshold. Therefore, it is possible to prevent the high-voltage battery from entering a deep discharge state, and thus from being damaged.

BRIEF DESCRIPTION OF THE DRAWINGS

FIG. 2 is a flow chart showing contents of control (operation) of a control device in the electric vehicle.

FIG. 3 is a graph showing a change in the remaining energy capacity according to the present invention and a change in the remaining energy capacity according to a conventional technology.

DESCRIPTION OF THE PREFERRED EMBODIMENTS

Figure 1:
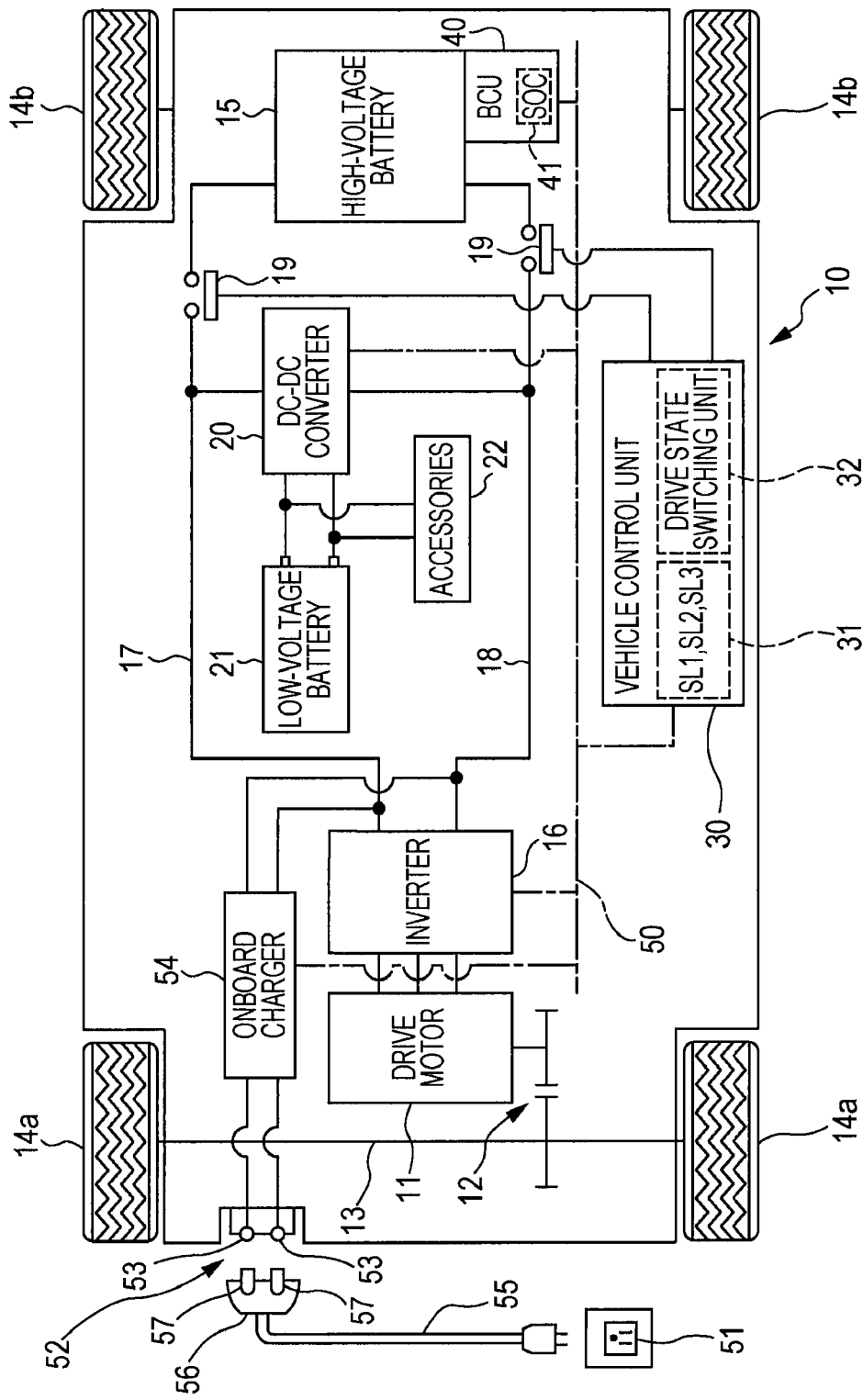
FIG. 1 is a schematic diagram of the configuration of an electric vehicle.

An embodiment of the present invention will hereunder be described with reference to the drawings.

FIG. 1 is a schematic diagram of the configuration of an electric vehicle. FIG. 2 is a flow chart showing contents of control (operation) of a control device in the electric vehicle. FIG. 3 is a graph showing a change in the remaining energy capacity according to the present invention and a change in the remaining energy capacity according to a conventional technology.

As shown in FIG. 1, an electric vehicle 10 is equipped with a drive motor 11 that is comprised of a three-phase DC motor. A driveshaft 13 is connected to the drive motor 11 by the intermediary of a gear train 12. A pair of front wheels 14a is co-rotatably provided at the both ends of driveshaft 12. The electric vehicle 10 has a pair of rear wheels 14b, and thus the electric vehicle of the present embodiment is a four-wheel drive vehicle equipped with she front wheels 14a and rear wheels 14b. As seen above, the electric vehicle 10 employs a front-wheel drive system such that the front wheels 14a are driven by the drive motor 11. However, a PM motor, brushless DC motor or the like may also be used as the drive motor of the present invention.

A high-voltage battery 15 is mounted on the electric vehicle 10 that functions as a power supply source for the drive motor 11. The high-voltage battery 15 is a lithium-ion rechargeable battery and the voltage control range thereof is 280 volts to 380 volts. However, an electricity storage element such as nickel metal hydride rechargeable battery and electric double layer capacitor may be used as the high-voltage battery of the present invention.

The drive motor 11 is electrically connected to an inverter 16, and a pair of conducting cables 17 and 18 is electrically connected between the inverter 16 and the high-voltage battery 15. The drive motor 11 has a function of a motor-generator (M/G) that can operate as a drive source and power generator. When the drive motor 11 operate as the drive source, direct current from the high-voltage battery 15 is converted to alternate current by the inverter 16, and resultant alternate current is provided to the drive motor 11. On the other hand, when the drive motor 11 operates as the power generator, alternate current form the drive motor 11 is converted to direct current by the inverter 16, and resultant direct current is provided to the high-voltage battery 15. A pair of main relays 19 is provided to the conducting cables 17 and 18.

A low-voltage battery 21 is electrically connected to the high-voltage battery 15 by the intermediary of the conducting cables 17 and 18, a DC-DC converter 20. An example of the low-voltage battery 21 is a lead-acid battery with a voltage control range of 10 volts to 40 volts. The low-voltage battery 21 is used as a power source for the inverter 16, DC-DC converter 20, control units 30 and 40, onboard charger 54, and the like.

Accessories 22 are electrically connected between the low-voltage battery 21 and the DC-DC converter 20. The accessories 22 include onboard devices such as a power steering pump, negative pressure pump for a brake, electric motor for a wiper device and headlight (not shown) that are driven with a low voltage. The accessories 22 are driven with electricity that is stepped down to approximately 14.5 volts by the inverter 20. The stepped-down electricity by the inverter 20 is also provided to the low-voltage battery 21, which is charged therewith.

The electric vehicle 10 is equipped with a vehicle control unit 30 for overall control of the electric vehicle 10. Vehicle information signals of a vehicle speed sensor, accelerator switch, brake switch and the like (not shown) are input to the vehicle control unit 30. An operation information signal of the accessories 22 is also input thereto, the signal which indicates whether the accessories 22 are active or not. Then the vehicle control unit 30 executes a predetermined calculation process based on the vehicle information signals and the operation information signal of the accessories 22 so as to control ON and OFF of the main relays 19 and output a control signal to the DC-DC converter 20, inverter 16 and the like.

The electric vehicle is equipped with a battery control unit (BCU) 40 for controlling charge and discharge of the high-voltage battery 15. The BCU 40 is provided with a remaining energy capacity detecting unit 41. The remaining energy capacity detecting unit 41 is designed to monitor the voltage, current, ambient temperature and the like of the high-voltage battery 15, and, based thereon, detect the remaining energy capacity SOC of the high-voltage battery. Furthermore, the BCU 40 is designed to control voltage output and current output of the high-voltage battery 15 based on the remaining energy capacity SOC detected by the remaining energy capacity detecting unit 41. The control device of the present invention is configured with the vehicle control unit 30 and BCU 40.

A communication network 50 chat is composed of a CAN or the like is built in the electric vehicle 10. The communication network 50 electrically connects the vehicle control unit 30, BCU 40, DC-DC converter 20, inverter 16 and the like. The communication network 50 allows communication of the information signals between the units connected the communication network 50.

The vehicle control unit 30 is provided with a threshold storing unit 31 and a drive state switching unit 32. The threshold storing unit 31 stores a first threshold SL1, a second threshold SL2 that is smaller than the first threshold SL1 and a third threshold SL3 that is smaller than the second threshold SL2 (SL1>SL2>SL3). The thresholds SL1, SL2 and SL3 are to be compared with a detection signal from the remaining energy capacity detecting unit 41 which is provided to the BCU 40. The thresholds SL1, SL2 and SL3 are read to the state drive state switching unit 32 along with the remaining energy capacity SOC.

The drive state switching unit 32 is designed to receive the remaining energy capacity SOC and thresholds SL1, SL2 and SL3, compare the read remaining energy capacity SOC and the read thresholds SL1, SL2 and SL3, and switch the drive state of the drive motor 11 and accessories 22 based on a comparison result. More specifically, the drive state switching unit 32 is designed to switch the drive state of the drive motor 11 and accessories 22 to a following first, second, or third state.

The first state is such that when the remaining energy capacity SOC of the high-voltage battery 15 falls below the first threshold SL1, the drive state is switched to "torque output reduction control/accessories continuation control" that gradually reduces power supply to the drive motor 11 while allowing the accessories 22 to operate. Accordingly, the vehicle drive unit 30 performs control so as to gradually reduce torque output of the drive motor 11 while allowing the accessories 22 to operate.

The second state is such that when the remaining energy capacity SOC of the high-voltage battery 15 falls below the second threshold SL2, the drive state is switched to "drive motor stop control/accessories continuation control" that stops power supply to the drive motor 11 while allowing the accessories 22 to operate. Accordingly, the vehicle drive unit 30 performs control so as to stop the operation of the drive motor 11 while allowing the accessories 22 to operate.

The third state is such that when the remaining energy capacity SOC of the high-voltage battery 15 falls below the third threshold SL3, the drive state is switched to "accessories stop control/system power OFF control" that stops power supply to the accessories 22 and turns off an system power of the electric vehicle 10. Accordingly, the vehicle drive unit 30 performs control so as to stop the operation of the accessories 22 and turn off the system power of the electric vehicle 10. Here the third threshold SL3 is a threshold for preventing the high-voltage battery 15 from entering a deep discharge state and a lower limit of the remaining energy capacity SOC of the high-voltage battery 15.

The electric vehicle 10 is provided with a charge socket 52 as a power source connecting unit to charge the high-voltage battery 15 with a commercial power supply 51 (AC 200 volts, for example). The charge socket 52 is provided with a pair of connecting terminals 53, and the connecting terminals 53 are electrically connected to the onboard charger 54. A charge cable 55 that is used by connecting to the commercial power supply 51 is integrally provided with a connector 56. The connector 56 is provided with a pair of connecting terminals 57 that correspond to the connecting terminals 53 of the charge socket 52.

The other side to the charge socket 52 of the onboard charger 54 is electrically connected to the connecting cables 17 and 18. Accordingly, electric power can be supplied to the high-voltage battery 15 from the commercial power supply 51 through the onboard charger 54 and the connecting cables 17 and 18 by connecting the charge socket 52 to the connector 56. Here, when the high-voltage battery 15 is charged with the commercial power supply 51, the low-voltage battery 21 is also charged through the onboard charger 54, connecting cables 17 and 18 and DC-DC converter 21. The onboard charger 54 is electrically connected to the communication network 54 and controlled by the vehicle control unit 30.

Next, the contents of control (operation) of the above-formed control device (vehicle control unit 30 and BCU 40) of the electric vehicle 10 will be described in detail with reference to FIGS. 2 and 3. Here, a control logic shown in FIG. 2 is repeated at a predetermined interval (for, example, every 10 minutes) after an ignition switch (not shown) is turned on to turn on the system power of the electric vehicle 10.

As shown in FIG. 2, when the control logic is started in step S1, the remaining energy capacity detecting unit 41 detects a remaining energy capacity SOC in step S2. Then, in following step S3, the drive state switching unit 32 reads the remaining energy capacity SOC and first threshold SL1 and determines whether or not the remaining energy capacity SOC is less than the first threshold SL1. When YES is determined at step S3, the process proceeds to step S4. When NO is determined at step S3, the process proceeds to step S9.

In step S4, on the ground that the remaining energy capacity SOC has decreased and fallen below the first threshold SL1, the state of the drive motor 11 and accessories 22 that has been "normal control" is switched to "torque output reduction control/accessories continuation control" by the drive state switching unit 32 (see a switching point P1 in FIG. 3). Accordingly, the accessories 22 can operate as previously, that is, can continuously assist the steering operation, braking operation and the like of the driver. On the other hand, the torque output of the drive motor 11 is gradually reduced. Here, since power supply to the drive motor 11 is limited, as shown in FIG. 3, the decreasing rate of the remaining energy capacity SOC (slope of the graph) becomes slightly modest.

Since the torque output of the drive motor 11 is gradually reduced, the driver can continuously operate the electric vehicle 10 without feeling discomfort. Furthermore, in order to inform the driver that the drive state has been switched to "torque output reduction control/accessories continuation control," for example, a warning indicator provided at an instrument panel (not shown) may be activated or a countdown of a remaining period of time in which the drive motor can operate may be displayed. Thereby, a charging timing of the high-voltage battery can be effectively informed to the driver.

In step S5, the drive state switching unit 32 reads the remaining energy capacity SOC and the second threshold SL2 and determines whether or not the remaining energy capacity SOC is less than the second threshold SL2. When YES is determined in S5, the process proceeds to step S6. When NO is determine in step S5, the process proceeds to step S9.

In step S6, on the ground that the remaining energy capacity SOC has decreased and fallen below the second threshold SL2, the state of the drive motor 11 and accessories 22, which has been "torque output reduction control/accessories continuation control," is switched to "drive motor stop control/accessories continuation control" by the drive state switching unit 32 (see a switching point P2 in FIG. 3). Accordingly, the accessories 22 can operate as previously, and the operation of the drive motor 11 is stopped. Here, since power supply to the drive motor is discontinued, as shown in FIG. 3, the decreasing rate of the remaining energy capacity SOC becomes more modest.

Also here, a warning indicator (not shown) may be activated to inform the driver that the drive state has been switched to "torque output reduction control/accessories continuation control."

In Step S7, the drive state switching unit 32 reads the remaining energy capacity SOC and the third threshold SL3 and determines whether or not the remaining energy capacity SOC is less than the second threshold SL3. When YES is determined in step S7, the process proceeds to step S8. When NO is determined in step S7, the process proceeds to step S9.

In step S8, on the ground that the remaining energy capacity SOC has decreased and fallen below the third threshold SL3, the state of the drive motor 11 and accessories 22, which has been "drive motor stop control/accessories continuation control," is switched to "accessories stop control/system power OFF control," by the drive state switching unit 32 (see a switching point P3 in FIG. 3). Accordingly, the operation of the accessories 22 is also stopped and the system power is also turned off. Here, since power supply to the drive motor 11 and accessories 22 is discontinued, as shown in an "accessories stop control/system power OFF control region (deep discharge region) in FIG. 3, almost no remaining energy capacity SOC is consumed and thus the high-voltage battery 15 can be prevented from entering a deep discharge state.

In following step S9, processing is executed chat finally terminates the control logic. When NO is determined in step S3, "normal control" which has been executed before step S3 is continuously executed. When NO is determined in step S5, "torque output reduction control/accessories continuation control" which has been executed before step S5 is continuously executed. When NO is determined in step S7, "drive motor stop control/accessories continuation control" which has been executed before step S7 is continuously executed.

Reference character T in FIG. 3 indicates a period of time in which the accessories 22 can operate after the operation of the drive motor 11 is stopped (accessories operational time). Reference character P4 in FIG. 3 indicates a termination point of the above-mentioned conventional technology at which the driver motor and accessories stop (simultaneous termination point). According to the control logic of the conventional technology, while both of the drive motor and accessories are stopped at the simultaneous termination point P4. According to the control logic of the present invention, on the other hand, a relatively long accessories operational time T can be obtained between the switching points P2 and P3 and only the accessories 22 can be operated during this time.

As described above in detail, according to the control device of an electric vehicle of the present embodiment, the threshold storing unit 31 is provided which stores two large and small thresholds SL1 and SL2 (first threshold SL1>second threshold SL2) and the drive state switching unit 32 is provided which reduces torque output of the drive motor 11 while allowing the accessories 22 to operate when the remaining energy capacity SOC from the remaining energy capacity detecting unit 41 fails below the first threshold SL1, and stops power supply to the drive motor 11 while allowing the accessories 22 to operate when the remaining energy capacity SOC from the remaining energy capacity unit 41 falls below the second threshold SL2.

Thus, when she remaining energy capacity SOC of the high-voltage battery 15 becomes low, it is possible so reduce torque output to the drive motor 11 and then to stop power supply thereto, while driving the accessories. Accordingly, even when the energy capacity SOC of the high-voltage battery 15 becomes low and the electric vehicle 10 enters the driving impossible state, it is possible continuously to drive the accessories 22. Therefore, when, for example, the remaining energy capacity SOC of the high-voltage battery becomes low while the electric vehicle is driving on a downhill, the operational performance of the accessories 22 assisting the driver's operation dose not become low, which does not give anxiety to the driver.

Furthermore, according to the control device for an electric vehicle of the present embodiment, the third threshold SL3 which is smaller than the second threshold SL2 and the lower limit of the remaining energy capacity of the high-voltage battery 15 is stored in the threshold storing unit 31, and the drive state switching unit 32 stops the operation of the accessories 22 when the remaining energy capacity SOC falls below the third threshold SL3. Therefore, it is possible to prevent the high-voltage battery 15 from entering a deep discharge state, and thus from being damaged.

Of course, the present invention is not limited to the above-described embodiment, and various changes may be made without departing from the scope of the invention. For example, in the above-mentioned embodiment, the electric vehicle 10 which is driven only with the drive motor 11 is employed as an electric vehicle, and the control device according to the present invention (vehicle control unit 30 and BCU 40) is mounted on the electric vehicle 10. However, the present invention is not limited to this, and applicable to a control device for an electric vehicle that has two drive systems of internal combustion and drive motor, so called hybrid vehicle.

Furthermore, in the above-described embodiment, the present invention is applied to the electric vehicle 10 which employs a front-wheel drive system driving the front wheels 14a. However, the present invention is not limited to this, and applicable to an electric vehicle that employs a rear-wheel drive system driving rear wheels and an electric vehicle that employs a four-wheel drive system driving front and rear wheels.

What is claimed is:

1. A control device for an electric vehicle that controls electric power from a high-voltage battery and drives a drive motor and accessories comprising:
   a remaining energy capacity detecting unit that detects a remaining energy capacity of the high-voltage battery;
   a threshold storing unit that stores a first threshold and a second threshold smaller than the first threshold that are to be compared with a detection signal from the remaining energy capacity detecting unit; and
   a drive state switching unit that compares the detection signal and the first and second thresholds and switches a drive state of the drive motor and accessories in response to a comparison result; and
   wherein the drive state switching unit reduces torque output of she drive motor, while allowing the accessories to operate, when the detection signal falls below the first threshold, and stops power supply to the drive motor, while allowing the accessories to operate, when the detection signal falls below the second threshold.

2. The control device for an electric vehicle according to claim 1:
   wherein the threshold storing unit stores a third threshold that is smaller than the second threshold and a lower limit of the remaining energy capacity of the high-voltage battery; and
   wherein the drive state switching unit stops the operation of the accessories when the detection signal falls below the third threshold.

* * * * *